United States Patent [19]

Tamura et al.

[11] Patent Number: 5,328,816
[45] Date of Patent: Jul. 12, 1994

[54] PROCESS FOR PRODUCING OPTICAL RECORDING MEDIUM

[75] Inventors: Miki Tamura, Yokohama; Hiroyuki Sugata, Yamato; Osamu Kanome, Kawasaki; Yukitoshi Okubo, Yohohama; Mizuho Hiraoka, Kawasaki; Masataka Yashima, Yokohama, all of Japan

[73] Assignee: Canon Kabushiki Kaisha, Tokyo, Japan

[21] Appl. No.: 908,815

[22] Filed: Jul. 9, 1992

Related U.S. Application Data

[63] Continuation of Ser. No. 752,980, Sep. 3, 1991, abandoned, which is a continuation of Ser. No. 405,211, Sep. 11, 1989, abandoned.

[30] Foreign Application Priority Data

Sep. 13, 1988 [JP] Japan ................ 63-227617
Nov. 15, 1988 [JP] Japan ................ 63-286742
Nov. 15, 1988 [JP] Japan ................ 63-286743

[51] Int. Cl.$^5$ ............................ B29D 12/00
[52] U.S. Cl. .................... 430/495; 430/20; 430/945; 346/135.1; 264/1.7; 264/106; 264/129
[58] Field of Search ........... 264/1.1, 1.7, 220, 106, 264/129; 430/495, 945, 270, 22; 369/290, 288, 283; 346/135.1

[56] References Cited

U.S. PATENT DOCUMENTS

| | | | |
|---|---|---|---|
| 3,502,761 | 3/1970 | Dimitracopoulos | 264/220 |
| 4,252,889 | 2/1981 | Tinet et al. | 430/290 |
| 4,308,545 | 12/1981 | Lehureau et al. | 430/945 |
| 4,619,804 | 10/1986 | Leonard et al. | 430/269 |
| 4,668,550 | 5/1987 | Tajima et al. | 430/945 |
| 4,739,345 | 4/1988 | Namba et al. | 369/283 |
| 4,790,893 | 12/1988 | Watkins | 264/220 |
| 4,816,362 | 3/1989 | Takeda et al. | 430/14 |
| 4,839,251 | 6/1989 | Ohta et al. | 430/5 |
| 4,852,077 | 7/1989 | Clark et al. | 430/495 |
| 4,871,601 | 10/1989 | Miura et al. | 428/64 |
| 4,920,359 | 4/1990 | Arai et al. | 369/283 |
| 4,965,118 | 10/1980 | Kodura et al. | 430/495 |
| 4,965,153 | 10/1990 | Imataki et al. | 430/945 |

FOREIGN PATENT DOCUMENTS

| | | | |
|---|---|---|---|
| 60-261040 | 12/1985 | Japan . | |
| 63-153745 | 6/1988 | Japan | 369/275.4 |
| 64-67738 | 3/1989 | Japan | 369/275.4 |

OTHER PUBLICATIONS

Uchida et al. "Abstract of 60-261040" Optical Information Medium disc. Dec. 1985.

Primary Examiner—Lee C. Wright
Assistant Examiner—Martin Angebranndt
Attorney, Agent, or Firm—Fitzpatrick, Cella, Harper & Scinto

[57] ABSTRACT

A process for producing an information recording medium comprising a substrate and provided thereon a recording layer and protective layer comprises the steps of forming on one substrate sheet a plurality of grooved preformats used for information recording mediums, forming a recording layer on the substrate sheet having thereon said plurality of grooved preformats, forming a protective layer on the substrate sheet on which said recording layer has been formed, and cutting the resulting substrate sheet into individual information recording mediums.

6 Claims, 3 Drawing Sheets

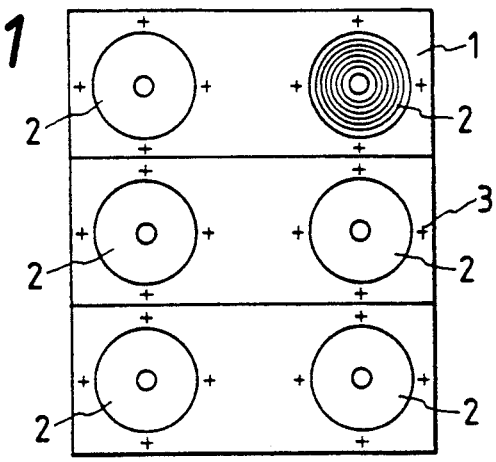
FIG. 1
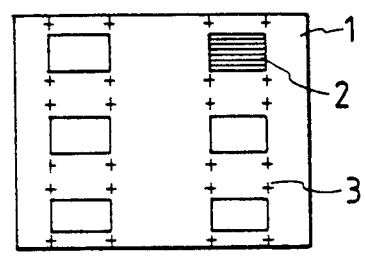
FIG. 2
FIG. 3(a)
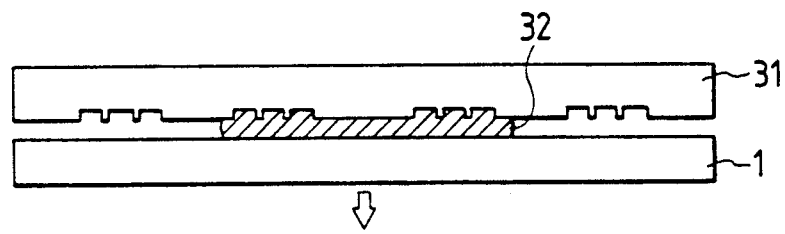
FIG. 3(b)
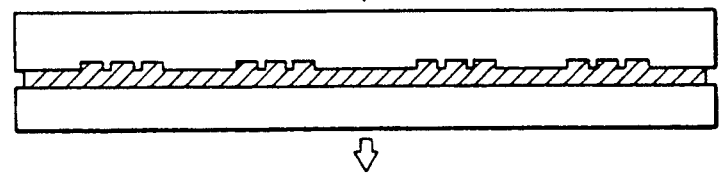
FIG. 3(c)
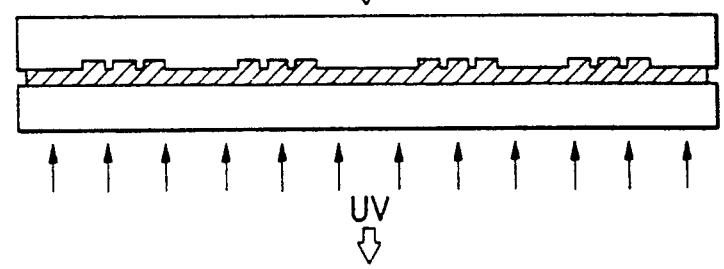
↑ ↑ ↑ ↑ ↑ ↑ ↑ ↑ ↑ ↑ ↑ ↑ ↑
UV
FIG. 3(d)
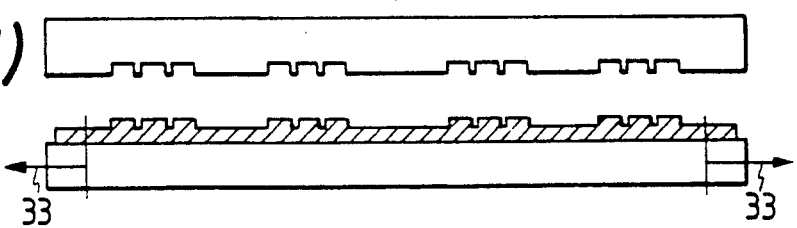

PROCESS FOR PRODUCING OPTICAL RECORDING MEDIUM

This application is a continuation of U.S. application Ser. No. 07/752,980 filed Sep. 3, 1991, now abandoned, and U.S. application Ser. No. 07/405,211, filed Sep. 11, 1989, now abandoned.

BACKGROUND OF THE INVENTION

1. Field of the Invention

The present invention relates to a process for producing an optical recording medium suited for carrying out optical recording and/or reproduction using a laser beam or the like.

2. Related Background Art

Optical information recording mediums such as optical disks and optical cards comprises a substrate and provided thereon a thin recording layer on which optically detectable minute pits of about several $\mu m$ are formed in the form of tracks. Information can be thus recorded in a high density.

A process for producing such information recording mediums comprises a step of forming a grooved preformat on the support, a step of forming a recording layer, a step of forming a protective layer, and so forth. Of these, known as methods used in the formation of the support include an injection method, a compression method, and a photopolymerization method using an ultraviolet-curable resin (herein after "2OP method").

In these production processes, the information recording medium as a whole is usually prepared in an individual sheet (hereinafter called sheet-by-sheet process). The reason for the sheet-by-sheet process having been mostly adopted is because spin coating is mostly used in solution coating when the recording layer is provided, and, in view of the alignment required when the protective layer and an adhesive layer are provided.

The sheet-by-sheet process, however, results in an increase in the time required for the processing steps, and is not suited for production processes aiming at low cost and an improvement in operability.

In the instance of the 2P method, the ultraviolet-curable resin commonly used includes polyester acrylate, epoxy acrylate and urethane acrylate, which belong to a radical polymerization type. These, however, may be inhibited from curing because of the presence of oxygen in the air. Hence, there has been the problem that the resin is not well cured at the central hole and peripheral part of the disk, so that unreacted monomers remain in the resin, and these residual monomers diffuse in the recording layer, resulting in a deterioration of the recording layer.

As a countermeasure to cope with this problem, one may contemplate a method in which the curing is carried out in an inert gas or a method in which the unreacted portion is removed using a solvent or cut away, but both of them bring about complicated steps when conventional production processes are used.

In forming the protective layer, it is also common to use a material having the same size as, and similar shape to, the substrate, where it has been required for each sheet to be processed in the desired shape, size and thickness and then aligned. Further, a similar problem has remained in each functional layer and adhesive layer. Moreover, the dust produced at end surfaces of the substrate may be often included into the recording layer and protective layer when the recording layer is formed or the protective layer is laminated, resulting in a lowering of the yield of products.

SUMMARY OF THE INVENTION

The present invention was made in view of the above problems. An object of the present invention, is to provide a process for producing an information recording medium, that can shorten the time required for the steps in producing the information recording medium, and can achieve an improvement in operability, a low cost and also a good yield.

The process of the present invention, for producing an information recording medium is a process for producing an information recording medium comprising a substrate and provided thereon a recording layer and a protective layer, said process comprising the steps of;

forming on one substrate sheet a plurality of grooved preformats used for information recording mediums;

forming a recording layer on the substrate sheet having thereon said plurality of grooved preformats;

forming a protective layer on the substrate sheet on which said recording layer has been formed; and cutting the resulting substrate sheet into individual information recording mediums.

This makes it unnecessary to make alignment for each substrate used for one information recording medium when the protective layer is formed, resulting in an improvement in the productivity. This also decreases the dust produced at end surfaces of the substrate and hence lessen the same included in the information recording medium, resulting in an improvement in the yield.

BRIEF DESCRIPTION OF THE DRAWINGS

FIGS. 1 and 2 are schematic illustrations of substrate sheets for information recording mediums, that can be used in the present invention;

FIGS. 3(a) to 3(d) are diagramatic illustrations to show an embodiment of the process for producing the information recording medium according to the present invention;

DESCRIPTION OF THE PREFERRED EMBODIMENTS

Figure 4:
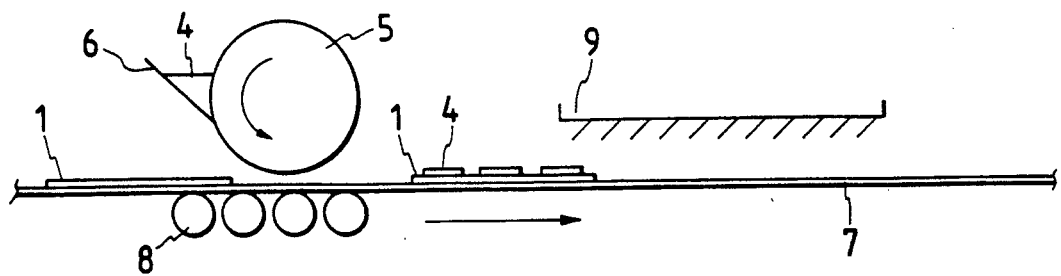
FIG. 4 is a schematic illustration of a step of forming a recording layer on the substrate sheet of the present invention.

FIGS. 1 and 2 are schematic illustrations to show substrate sheets for information recording mediums, that can be used in the present invention, in which grooved preformats used for a plurality of information recording mediums are formed.

Here are shown in FIG. 1 an example in which preformats with concentric circle-like grooves, used for disk-like information recording medium are formed, and in FIG. 2 an example in which preformats with stripe-like grooves, used for card-like information recording mediums are formed. In FIGS. 1 and 2, the numeral 1 denotes a substrate sheet; 2, a grooved preformat; and 3, an alignment mark.

As methods of forming the grooved preformat on the substrate sheet, any system may be used including an injection method, a compression method, a 2P method and an embossing method. The 2P method, however, may preferably be used particularly because of solvent resistance of the substrate and good transfer performance of grooved preformat patterns. FIGS. 3(a) to 3(d) illustrate a process for producing the substrate sheet of the present invention, using the 2P method.

As shown in FIG. 3(a), an appropriate amount of an ultraviolet-curable resin 32 is injected to the gap between a substrate sheet 1 having excellent optical characteristics and a sramper 31. Here, used as the sramper is a sramper having a plurality of grooved preformats 2 and alignment marks 3 as shown in FIG. 1.

Subsequently, a pressure is applied using a roller or the like to spread out the above ultraviolet-curable resin to the above gap between the substrate sheet and sramper (FIG. 3(b)). On this occasion, the ultraviolet-curable resin may preferably be so spread out that it reaches the outer side (33 in FIG. 3(d)) of the part corresponding to the peripheral part of the medium. This is because the peripheral part of the ultraviolet-curable resin at which the curing does not sufficiently take place since it is inhibited because of the presence of oxygen in the air, and hence unreacted monomers tend to remain, can thereby be outside the region for the information recording medium. Next, irradiation with ultraviolet rays is carried out from the substrate side so that the ultraviolet-curable resin may: cure (FIG. 3(c)), and then the sramper is peeled off (FIG. 3(d)). Thus, an ultraviolet-curable resin layer 3' having a plurality of grooved preformats and alignment marks is formed on the substrate sheet.

The substrate sheet of the present invention can be prepared by any of the injection method, compression method, 2P method and embossing method. In the instance of the injection method, a plurality of substrates having a preformat formed by the injection method may be laminated on a thin sheet with the surface of the substrate having no preformat being made an adhesion surface. In the instance of the compression method, a plurality of preformats may be formed simultaneously on one resin sheet by use of a mold with a plurality of grooved preformat patterns, or a plurality of preformats may be formed, one by one, on one resin sheet by use of a mold having only one preformat pattern. In the instance of the 2P method or casting method, a plurality of the molded substrates prepared by any one of a mold having a plurality of preformat patterns and a mold having one preformat pattern may be laminated, one by one, on a thin sheet with the surface of the substrate having no preformat being made an adhesion surface.

Next, a recording layer 4 is formed on the substrate sheet on which the grooved preformat patterns and alignment marks have been formed. FIG. 4 illustrates a process of forming the recording layer on the substrate sheet 1, in particular, a recording layer forming step according to solution coating. The substrate sheet 1 is put on a conveyor belt 7, and passed between a gravure roll 5 of a gravure coater and conveyor rolls 8. At this time, an ink 4 comprising a recording material dissolved therein, held on a blade 6, is transferred on the recording layer pattern 2 of the substrate sheet 1. Thereafter, the ink 4 is passed through a drying furnace 9 by means of the conveyor belt and dried there. The ink, used herein, may preferably be an ink capable of forming an organic thin film whose optical physical properties are changeable by energy beams, and also capable of being continuously coated by using a solution or dispersion system. The recording material includes, for example, anthraquinone derivatives (those having an indanthrene skeleton), dioxazine compounds and derivatives thereof, triphenodithiazine compoounds, phenanthrene derivatives, cyanine compounds, merocyanine compounds, pyrylium compounds, xanthene compounds, triphenylmethane compounds, croconium coloring matters, azo compounds, croconics, azines, indigoids, polymethine coloring matters, azulenes, squatilium derivatives, sulfur dyes, and complexes such as a dithiolate complex of a metal.

The gravure coating was exemplified for the coating step, but there may be additionally included dip coating, spray coating, bar coating, roll coating, blade coating, knife coating, and curtain coating.

Though not illustrated in the drawing, a vacuum film forming technique may also be used as the method of forming the recording layer on the substrate sheet 1. In this instance, oxides of metals such as Te, Sb, Mo, Ge, V and Sn, compounds such as TeSn and TeOx-Ge, composites of metals with organic compounds or inorganic sulfide compounds, such as Te—$CH_4$, Te—$CS_2$, Te-styrene, Sn—$SO_2$, GeS—Sn, and Sn—S, pigments, and chalcogen compounds may be included.

Figure 5:
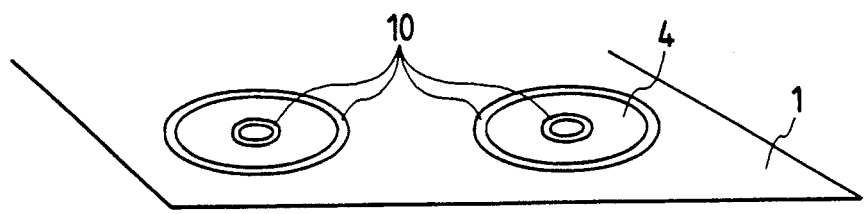
FIGS. 5 to 8 are schematic illustrations of a step of forming a protective layer.
Figure 6:
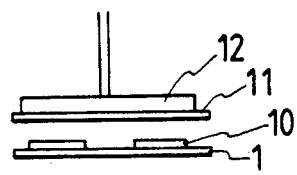

FIGS. 5 and 6 illustrate an example of a step of providing the protective layer. FIG. 5 shows a state in which the substrate sheet 1 having the recording layer 4 formed thereon is applied with an adhesive 10. This is then processed as shown in FIG. 6, where a protective material 11 is laid overlapping on the substrate sheet 1, followed by pressing using a pressing machine 12 to form the protective layer on the substrate sheet 1.

Figure 7:
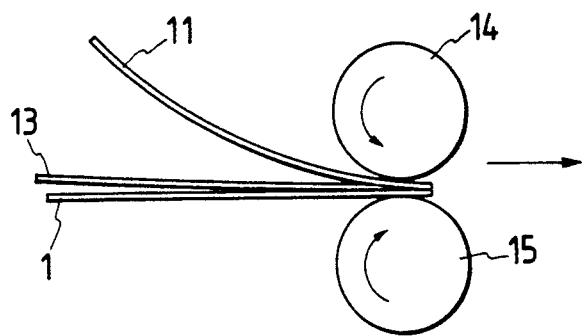

FIG. 7 illustrates another example for the step of providing the protective layer. In instances in which no spacer is provided, a hot-melt adhesive sheet 13 may be held between the substrate sheet 1 and protective substrate sheet 11, which are then passed between laminatot rolls 14 and 15 to carry out laminating, so that the protective layer is provided.

Figure 8:
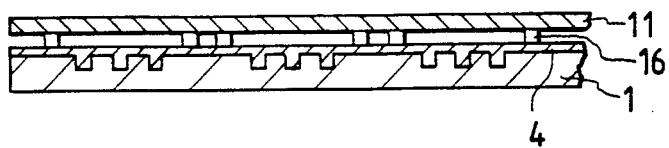

The protective layer may also be laminated interposing a spacer 16 as shown in FIG. 8, so that an information recording medium of an air-gap type is obtained. When laminated interposing the spacer, the lamination can be relatively simply carried out by coating the joining surface with an adhesive in which beads or the like having uniform particle diameter serving as spacers are mixed, followed by overlapping of the substrate sheet and protective substrate sheet.

As a final step, cutting may be carried out by laser cutting or punching to obtain information recording mediums. On this occasion, the alignment marks may preferably be previously formed on the substrate sheet, so that the lamination of the substrate sheet and protective substrate sheet or cutting can be carried out with a good precision. More specifically, cutting marks are used also when a single information recording medium is prepared using a single substrate, but, in the present invention, the spans between the alignment marks formed on one substrate sheet can be made larger, so that the lamination or cutting can be carried out with a good precision. On this occasion, the alignment marks used for the lamination can also be made to serve as the marks for cutting, but additional marks for cutting may also be formed on the substrate sheet and/or protective substrate sheet.

Another embodiment of the present invention will be described below.

Figure 9:
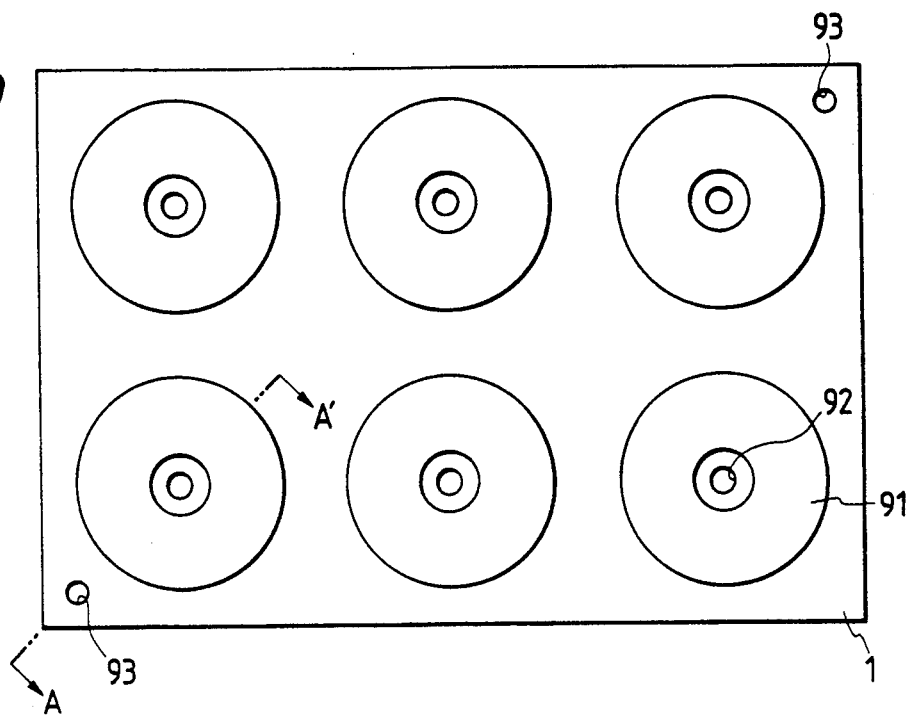
FIG. 9 is a plan view of a substrate sheet in which holes for making alignment are formed.

FIG. 9 illustrates a substrate sheet on which a plurality of grooved preformats usable in the present embodiment are formed.

In FIG. 9, the numeral 1 denotes a substrate sheet; 91, a preformat-forming area; 92, a central hole area; and 93, an alignment hole.

Figure 10:
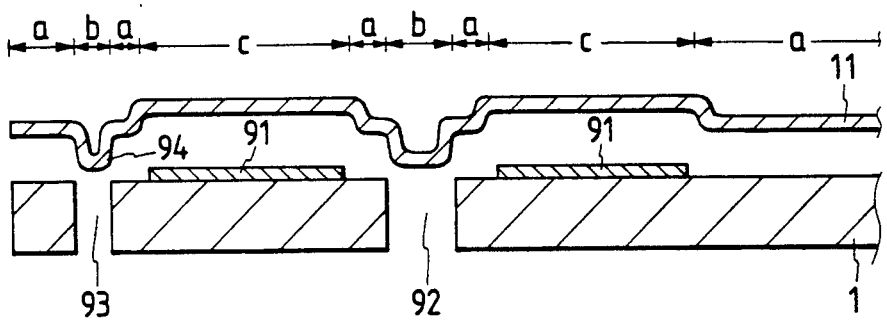
FIG. 10 is a diagramatic cross section along the line A—A' when a protective substrate sheet of the present invention, applied with projections and recessions, is formed on the substrate sheet shown in FIG. 9.
Figure 11:
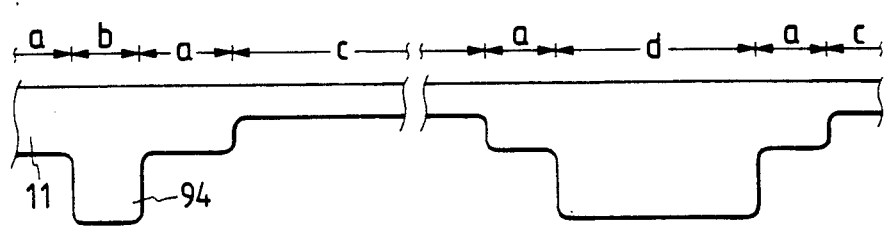
FIG. 11 is a schematic illustration to show another embodiment of the protective substrate sheet having been applied with projections and recessions.

FIG. 10 illustrates a diagramatical cross section cut along the line A—A' of the above substrate sheet 1 on which a protective substrate sheet 11 opposed thereto is disposed. For the purpose of illustration, the protective substrate sheet 11 is drafted in the state it is separated from the substrate sheet 1. Both, however, are disposed in contact with each other at the part a in FIG. 10 when completed. In the protective substrate sheet 11, a projection (the part b in FIG. 10) is formed which is engageable in the alignment hole 93 of the substrate sheet 1. Similarly, a projection, the part d, is also formed which is engageable in the central hole area of the substrate sheet 1. The substrate sheet 1 and protective substrate sheet 11 are applied with adhesion, or heat- or solvent-welding so that they can be fixed at the part a. The part c of the protective substrate sheet 11 protrudes in the direction opposite to the projection 94 so that an air layer can be formed. The air layer thus formed may have a thickness arbitrarily selected in the range of approximately from 0.1 to 1.0 mm. FIG. 11 shows another embodiment of the protective substrate sheet applied with projections and recessions.

A marker capable of being optically read may be provided at this part in place of the alignment hole 92 when the preformats are formed, and at the same time a fine marker capable of being optically read may be formed on the protective substrate sheet on the same plane with its part a in FIG. 10 in place of the projection 94. Both are laid overlapping each other and provisionally fixed at the time when the desired precision has been obtained. Thereafter, they are fixed by adhesion, or heat- or solvent-welding for each disk. If each disk can be simultaneously fixed, the provisional fixing may not be applied.

In a subsequent procedure, the product may be cut by laser cutting or punching as previously described. An information recording medium of an air-gap type can be thus obtained.

As illustrated in the present embodiment, the protective substrate sheet is formed with projections and recessions so that it has a part coming into contact with the substrate sheet within the non-recording region of the substrate sheet and a protective surface disposed opposingly to the recording layer with the air gap interposed therebetween within the recording region. Use of this protective substrate sheet makes it unnecessary to use spacers and makes it possible to form protective substrates for plural information recording mediums by making alignment once.

In the present invention, various adhesives can be used as the adhesive used in adhesion between the substrate sheet and protective substrate sheet, so long as they may not deteriorate the medium constituted of a recording layer, a substrate, a protective layer, etc., and, when they require energy such as heat, light, or electron rays in carrying out the adhesion, the energy may not deteriorate the function of the information recording medium.

The adhesive used in the information recording medium of the present invention includes, for example, adhesives of a vinyl acetate type, a vinyl acetate acrylic type, a vinyl acetate, copolymer type, vinyl acetate emulsion type, an acrylic type, a modified acrylic type, an acrylate type, an acrylic copolymer type, an ethylene type, an ethylene-vinyl acetate type, an ethylene-vinyl acetate copolymer type, a polyethylene type, a methylene chloride type, a polyamide type, a polyamidoimide type, a polyimide type, a urea type, an epoxy type, an epoxy-urethane type, an epoxy acrylate type, a hot-melt type urethane-acrylate type, a polyester type, a chloroprene type, a chloroprene rubber type, a nitrile type, a nitrile rubber type, an urethane type, a vinyl-urethane type, a polyurethane type, an olefin type, an SBR type (styrene-butadiene rubber), a polyol type, a silica-alumina type, a synthetic rubber type, an emulsion type, an oligoester type, a cellulose type, a formaldehyde type, an ultraviolet-curable type, a styrene-butadiene-Freon TA type, an organic solvent, a silicone type, a modified silicone type, or a buryl rubber type.

Materials for the substrate sheet 1 used in the present invention, though having more or less a difference depending on the manner of formation and the information recording mediums, may preferably be transparent. For example, they include glass, an acrylic resin, a polyester resin, a polycarbonate resin, a polysulfone resin, a vinyl resin, a polyimide resin, a polyacetal resin, a polyolefin resin, a polyamide resin, and a cellulose resin. The substrate sheet, however, may be opaque when the irradiation with recording and/or reproducing light to the information recording medium is carried out from the protective substrate side.

Materials used in the substrate sheet 1 can all be used as materials for the protective substrate sheet 11, and transparent materials are particularly preferred when the information recording medium is of transmission type. Specifically, there can be used polyvinyl chloride, a fluorine-substituted ethylene polymer, a vinyl chloride-vinyl acetate copolymer, a polyvinylidene chloride, acrylic polymers such as polymethyl methacrylate, polystyrene, polyvinyl butyral, acetyl cellulose, a styrene-butadiene copolymer, polyethylene, polypropylene, polycarbonate, and an epoxy acrylonitrile-butadiene-styrene copolymer. In some instances, a variety of materials including sheets of metals such as iron, stainless steel, aluminum, tin, copper and zinc, synthetic papers, and papers, as well as fiber-reinforced plastics, composite materials of metal powder of magnetic materials with plastics, and ceramics can be used depending on the purpose.

As described in the above, the present invention can shorten the time required for the steps of forming the protective layer of the information recording medium, can further improve operability, and has thus achieved the aim at cost saving. It can also prevent inclusion of impurities such as dust into optical recording mediums, and thus decrease the probability of occurrence of defective products, having achieved an improvement in the quality.

EXAMPLES

The present invention will be described below in greater detail by giving Examples.

EXAMPLE 1

On a 0.4 mm thick polycarbonate substrate sheet on which patterns of optical cards for 6 pieces as shown in FIG. 2 were transferred by compression molding, a solution obtained by dissolving a polymethine coloring matter (trade name: IR-820; a product of Nippon Kayaku Co., Ltd.) in diacetone alcohol so as to be in a concentration of 3% was coated to form a recording layer. Thereafter, as shown in FIG. 7, an adhesive sheet of a hot-melt type (an ethylene-vinyl acetate copolymer type ) was inserted between a 0.3 mm polycarbonate sheet and the substrate sheet, which were then laminated at a roll temperature of 110° C. and a feed rate of 0.3 m/sec. The resulting laminated sheet was cut by punching to obtain optical cards. Recording-reproducing contrast of the resulting optical cards was measured at a recording laser power of 4.0 mW (feed rate: 60 mm/sec), a laser oscillation pulse width of 200 μm and a reproducing power of 0.4 mW (feed rate: 400 mm/sec) to obtain a value of 0.64. This value was substantially the same as that of an optical card produced by the sheet-by-sheet system. The recording-reproducing contrast herein mentioned is defined as follows:

$$\text{Recording-reproducing contrast} = \frac{[(\text{Reflectance of unrecorded area}) - (\text{Reflectance of recorded area})]}{(\text{Reflectance of unrecorded area})}$$

The yield was also improved when compared with instances in which optical cards were individually produced.

EXAMPLE 2

On the whole surface of one side of a polymethyl methacrylate (hereinafter "PMMA") cast substrate sheet of 20 cm×30 cm and 1.2 mm thick an ultraviolet-curable resin layer with a thickness of about 30 μm having 6 sets of guide grooves (each formed in a doughnut shape of 46 mm in inner diameter and 80 mm in outer diameter) and alignment marks was formed by the 2P method. At this time, the ultraviolet-curable resin layer was formed extending to the outer side of the part corresponding to the peripheral area of the disk.

Next, on this layer, a solution obtained by dissolving in diacetone alcohol a polymethine dye represented by the following structural formula was coated using a gravure coater to form a recording layer with a thickness of about 1,000 Å.

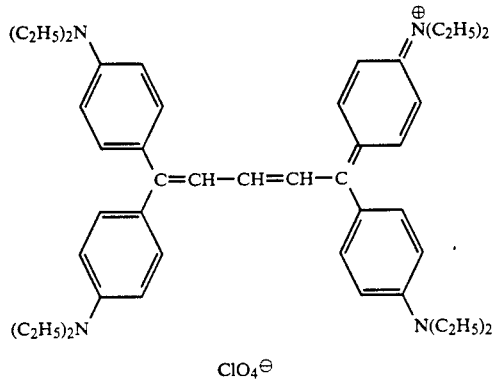

Next, alignment was made based on the above alignment marks. Thereafter, an adhesive in which beads of 300 μm in particle diameter were mixed as a spacer was coated on the joining surface. A PMMA cast substrate of 20 cm×30 cm and 1.2 mm thick was then laid overlapping on the resulting coating, and thus two sheets of substrates were laminated. Next, alignment was again made based on the above alignment marks, and the laminated substrate sheets were cut using laser beams to obtain 6 sheets of optical disk mediums of 15 mm in inner diameter, 86 mm in outer diameter and about 3 mm in thickness.

In the present Example, a number of mediums can be produced at one time, and hence it was possible to greatly shorten the production time per one sheet when compared with the conventional process. The mediums thus obtained were also found to have good signal characteristics and high reliability. The yield was also improved.

EXAMPLE 3

On the whole surface of one side of a PMMA cast substrate sheet of 30 cm×40 cm and 0.4 mm thick, an ultraviolet-curable resin layer with a thickness of about 30 μm having 16 sets of guide grooves (formed in a rectangular shape of 35 cm×80 cm) for card-like information recording mediums and alignment marks was formed by the 2P method. At this time, the ultraviolet-curable resin layer was formed extending to the outer side of the part corresponding to the outer edge area of the card.

Next, on this layer, a solution obtained by dissolving in dichloroethane an azulene dye represented by the following structural formula was coated using a roll coater to form a recording layer with a thickness of about 1,000 Å.

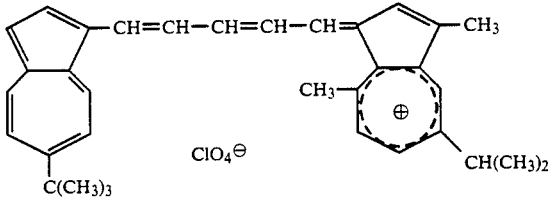

Next, on this recording layer, a PMMA cast substrate sheet of 30 cm×40 cm and 0.3 mm thick was then laid overlapping with a sheet-like adhesive of a hot-melt type interposed therebetween, followed by pressing using a heated roller. The two sheets of substrates were thus laminated. Next, alignment was made based on the above alignment marks, and the laminated substrate sheets were cut using laser beams to obtain 16 sheets of optical card mediums of 54.0 mm ×85.4 mm and about 0.8 mm thick.

In the present Example, a number of mediums can be produced at one time, and hence it was possible to greatly shorten the production time per one sheet when compared with the conventional process. The mediums thus obtained were also found to have good signal characteristics and high reliability.

EXAMPLE 4

An ultraviolet-curable resin (trade name: MRA-5000, a product of Mitsubishi Rayon Co., Ltd.) was coated on a polycarbonate sheet of 1.2 mm thick as the substrate sheet, optically homogeneous and having a birefringence (double refraction) of not more than 40 nm at both directions, followed by pressing using a sramper made of nickel and irradiation with ultraviolet rays to make the resin cure. Thereafter, the sramper was removed by peeling, and 6 spots of preformats comprising guide grooves of 80 mm in outermost diameter, address pits and the like were thus formed on the substrate sheet. At this time, the ultraviolet-curable resin layer was formed extending to the outer side of the part corresponding to the peripheral area of the disk. The guide grooves were formed with a pitch of 0.5 to 3 μm and a depth of 500 to 2,000 Å. The preformat pits such as the address pits were slender pits with a length of 0.5 to 3 μm. To form a recording layer on the substrate sheet on which the guide grooves and preformats were thus formed, a solution comprising a dye represented by the following structural formula (I) was coated thereon.

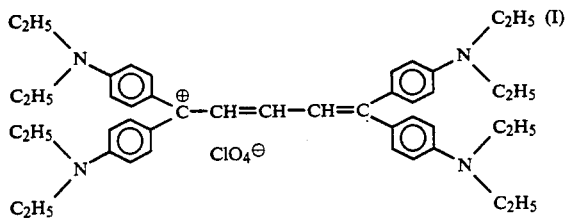

The guide grooves formed on the substrate sheet in the above step were provided with a space between grooves, of 100 mm pitch at the central position and with a precision of 0.01 to 0.1 mm. Holes of 5 mm in diameter were similarly provided at two corners of the substrate sheet with the above precision. A protective substrate sheet made of polycarbonate of 0.3 mm in thickness, provided with projections of 5 mm in height so as to be opposed to the alignment holes at the two corners of the substrate sheet, was laid overlapping on the substrate sheet. The protective substrate sheet was previously provided with recessions of 0.3 mm in depth as air layers at the parts corresponding to the guide grooves of the substrate sheet. Both substrate sheets were laid overlapping. Thereafter, both substrate sheets were fixed by heat- or solvent-welding for each disk, followed by punching to obtain individual disks.

The disks obtained met the standard values of a dynamic radial runout of not more than 50 μm and a bit error rate of not more than $10^{-5}$, showing substantially the same characteristics as those of disks produced by the conventional process.

EXAMPLE 5

As the substrate sheet, the same substrate sheet as Example 4 was used, and as the protective substrate sheet a polystyrene resin sheet having a sheet thickness of 1.0 mm at the air-gap part as shown in FIG. 3 was obtained by injection molding. Thus, optical disks were prepared in the same manner as Example 1.

The resulting disks met all the standard values for the dynamic radial runout, dynamic axial runout, warpage and error rate, showing substantially the same characteristics as those of disks produced by the conventional process.

EXAMPLE 6

In place of providing the alignment holes in the substrate sheet, alignment markers were previously formed with the projection-recession patterns when guide grooves were formed, and cross-shaped markers were also provided on a protective substrate sheet. Both substrate sheets were laid overlapping under a microscope to make alignment, and then the periphery was provisionally fixed, followed by the same procedure as Example 4 to prepare optical disks.

In respect of mechanical characteristics including dynamic radial runout, the resulting disks showed substantially the same characteristics as those produced by the conventional process.

What is claimed is:

1. A process for producing a plurality of air-sandwich type information recording media comprising a substrate sheet, a recording layer and a protective sheet, said process comprising the steps of:

providing a substrate sheet having a plurality of preformats corresponding to a plurality of respective information recording media on a surface of the substrate sheet, having alignment holes at a plurality of corners of said substrate sheet, and having a recording layer on the surface of said substrate sheet;

providing a protective sheet having projections which are engageable with said alignment holes of the substrate sheet and having a plurality of recesses for forming respective air gaps between the protective sheet and the recording layer of each individual information recording media within a recording region;

engaging said projections in said alignment holes and laminating said protective sheet on said substrate sheet;

fixing said protective sheet and said substrate sheet at a portion corresponding to a periphery of each individual information recording media; and cutting a resulting laminate comprising the protective sheet and the substrate sheet into a plurality of individual information recording media.

2. A process according to claim 1, wherein said fixing step includes fixing said protective sheet to said substrate sheet by adhesion, heat-welding or solvent-welding.

3. A process according to claim 1, wherein said alignment holes are located within a non-recorded region.

4. A process according to claim 1, wherein said recording layer contains an organic pigment.

5. A process according to claim 4, wherein said recording layer contains a polymethine coloring matter of the formula:

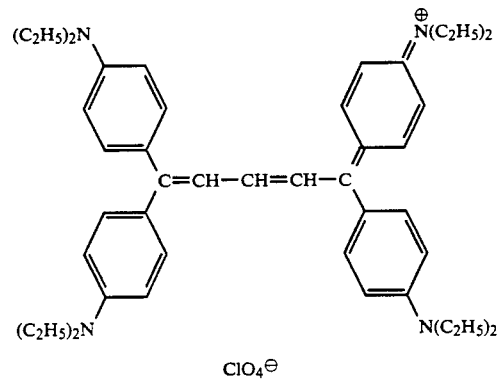

6. A process for producing a plurality of airsandwich type information recording media comprising a substrate sheet, a recording layer and a protective sheet, said process comprising the steps of:

providing a rectangular substrate sheet having a plurality of preformats corresponding to a plurality of respective information recording media on a surface of the substrate sheet, having alignment marks at a plurality of corners of said substrate sheet, and having a recording layer on the surface of said substrate sheet;

providing a protective sheet having alignment marks which overlap said alignment marks of the substrate sheet, and having a plurality of recesses for forming respective air gaps between the protective sheet and the recording layer of each individual information recording media within a recording region;

overlapping said alignment marks of the substrate sheet with the alignment marks of the protective sheet and laminating the protective sheet on the substrate sheet;

fixing said protective sheet and said substrate sheet at a portion corresponding to a periphery of each individual information recording media after the overlapping and laminating step; and cutting a resulting laminate comprising the protective sheet and the substrate sheet into a plurality of individual information recording media.

* * * * *

UNITED STATES PATENT AND TRADEMARK OFFICE
CERTIFICATE OF CORRECTION

PATENT NO. : 5,328,816
DATED : July 12, 1994
INVENTOR(S) : TAMURA ET AL.

It is certified that error appears in the above-indentified patent and that said Letters Patent is hereby corrected as shown below: Title page:

At [56] References Cited

U.S. Patent Documents, insert
--4,836,874 6/1989 Foster--.

Column 1

Line 18, "comprises" should read --comprise--.
Line 30, "herein after 20P" should read --hereinafter 2P--.

Column 3

Line 16, "sramper" (both occurrences) should read --stamper--.
Line 17, "sramper" should read --stamper--.
Line 22, "sramper" should read --stamper--.
Line 33, "may:cure" should read --may cure--.
Line 34, "sramper" should read --stamper--.

Column 4

Line 9, "compounds" should read --compounds,--.
Line 14, "squatilium" should read --squarilium--.
Line 43, "tot" should read --tor--.

Column 6

Line 21, "bruyl" should read --butyl--.

UNITED STATES PATENT AND TRADEMARK OFFICE
CERTIFICATE OF CORRECTION

PATENT NO. : 5,328,816
DATED : July 12, 1994
INVENTOR(S) : TAMURA ET AL.

It is certified that error appears in the above-indentified patent and that said Letters Patent is hereby corrected as shown below:

<u>Column 7</u>

Line 38, "was" should read --were--.

<u>Column 8</u>

Line 22, "was" should read --were--.
    Line 67, "sramper" should read --stamper--.

<u>Column 10</u>

Line 25, "media" should read --medium--.
    Line 32, "media," should read --medium;--.
    Line 65, "air sandwich" should read --air-sandwich--.

<u>Column 12</u>

Line 1, "media" should read --medium--.
    Line 9, "media" should read --medium--.

Signed and Sealed this

Thirteenth Day of December, 1994

Attest:

BRUCE LEHMAN

*Attesting Officer*       *Commissioner of Patents and Trademarks*